US012662862B2

(12) United States Patent
Vandendriessche et al.

(10) Patent No.: US 12,662,862 B2
(45) Date of Patent: Jun. 23, 2026

(54) TELESCOPIC HINGE

(71) Applicant: Renson Outdoor NV, Kruisem (BE)

(72) Inventors: Ruben Vandendriessche, Oudenaarde (BE); Joost Benjamin Renaat De Frene, Waregem (DE)

(73) Assignee: Renson Outdoor NV, Kruisem (BE)

( * ) Notice: Subject to any disclaimer, the term of this patent is extended or adjusted under 35 U.S.C. 154(b) by 415 days.

(21) Appl. No.: 18/550,094

(22) PCT Filed: Mar. 17, 2022

(86) PCT No.: PCT/IB2022/052414
§ 371 (c)(1),
(2) Date: Sep. 11, 2023

(87) PCT Pub. No.: WO2022/195524
PCT Pub. Date: Sep. 22, 2022

(65) Prior Publication Data

US 2024/0159092 A1 May 16, 2024

(30) Foreign Application Priority Data

Mar. 17, 2021 (BE) .................................. 2021/5202

(51) Int. Cl.
*E05D 15/00* (2006.01)
*E05D 15/26* (2006.01)

(52) U.S. Cl.
CPC ...... *E05D 15/266* (2013.01); *E05Y 2201/684* (2013.01); *E05Y 2201/708* (2013.01); *E05Y 2900/13* (2013.01)

(58) Field of Classification Search
CPC ..... E05D 15/264; E05D 15/266; E05D 15/22; E05D 15/26; E05D 15/242; E05D 15/244;
(Continued)

(56) References Cited

U.S. PATENT DOCUMENTS 1,448,845 A * 3/1923 Johnson .................... E06B 3/50
49/260
2,860,701 A 11/1958 Wood et al.
(Continued)

FOREIGN PATENT DOCUMENTS

CN 102797395 A 11/2012
CN 106150247 A * 11/2016 ............. E06B 3/486
(Continued)

OTHER PUBLICATIONS

Notification of Transmittal of the International Search Report and the Written Opinion for International Application No. PCT/IB2022/052414, mailed Jun. 24, 2022.

*Primary Examiner* — Chuck Y Mah
(74) *Attorney, Agent, or Firm* — HAMILTON, BROOK, SMITH & REYNOLDS, P.C.

(57) ABSTRACT

A telescopic hinge (30) is described for a rail guidance system (1) for guiding a sliding device (20) along an elongated guide rail (10) with a longitudinal axis (12). The telescopic hinge (30) comprises a first hinge part (32) and a second hinge part (34) that is mounted rotatably in the first hinge part (32) for rotation about a hinge-rotation axis (38). The second hinge part (34) is mounted slidably in the direction of the hinge-rotation axis (38); and configured for being mounted onto the guide rail (10) at an end (342) slidably along the longitudinal axis (12).

16 Claims, 5 Drawing Sheets

(58) Field of Classification Search
CPC ....... E05D 15/246; E05D 15/34; E05D 15/28; E05D 15/30; E05D 15/32; E05D 15/58; E05D 3/06; E05D 3/08; E05D 3/14; E05D 3/16; E05D 7/0407; E05D 7/0415; E05D 2003/166; E05D 2015/485; E05D 2015/586; E06B 7/36; E06B 7/367; E05Y 2900/20; E05Y 2900/212; E05Y 2201/684; E05Y 2201/708; E05Y 2900/13
See application file for complete search history.

(56) References Cited

U.S. PATENT DOCUMENTS 3,285,324 A * 11/1966 Stein ..................... E05D 15/266 16/229
3,390,418 A * 7/1968 Sheridan ............... E05D 7/0027 16/93 R
3,798,839 A * 3/1974 Kaufman .................. E06B 7/18 160/40
4,064,593 A * 12/1977 Helmick ............. E05D 15/0665 49/420
4,799,529 A * 1/1989 McAfee ................ E06B 3/9648 49/501
5,085,262 A * 2/1992 Tutikawa ............ E05D 15/0639 160/199
5,099,903 A 3/1992 Chen
7,065,827 B2 * 6/2006 Hsiao .................... B60B 33/045 16/35 D
2010/0299871 A1 * 12/2010 Kondash ................. E06B 3/481 16/87 R
2016/0024826 A1 * 1/2016 Smith ..................... E05D 15/26 160/197
2016/0305161 A1 10/2016 McMahon
2017/0298668 A1 * 10/2017 Lang ................... E05D 15/0639
2019/0178006 A1 6/2019 Capozziello et al.
2019/0194995 A1 * 6/2019 McGregor ............ E05D 15/264

FOREIGN PATENT DOCUMENTS

KR 101369499 B1 * 3/2014 ......... E05D 15/0634
KR 200483841 Y1 * 7/2017 ............... E05D 7/00

* cited by examiner

TELESCOPIC HINGE

This application is the U.S. National Stage of International Application No. PCT/IB2022/052414, filed Mar. 17, 2022, which designates the U.S., published in English, and claims priority under 35 U.S.C. § 119 or 365 (c) to Belgium Application No. 2021/5202, filed Mar. 17, 2021. The entire teachings of the above applications are incorporated herein by reference.

TECHNICAL FIELD

The invention relates to the technical field of a rail guidance system for a sliding device. In particular a rail guidance system for a sliding device for example such as a sliding door, a sliding window, or any other suitable slidable device such as a panel, a frame, a wall, etc. In particular when a rail guidance system like this is used on an inclined ground surface, for example such as is usual with a sliding device for a terrace, a balcony, etc. In particular when the rail guidance system is used with a sliding device that is fastened suspended, in other words wherein the weight of the sliding device is not or is barely received by a guide rail that is fastened on the ground surface.

TECHNOLOGICAL BACKGROUND OF THE INVENTION

From BE1022034B1, a guidance system for a sliding door device is known that is suitable for use on a terrace or a balcony, wherein the ground surface is normally positioned with a certain slope. In such circumstances the height difference that the rail guidance system must bridge may be up to several cm. Under the influence of temperature differences and weather conditions, this height difference may even increase. Such as is known from BE1022034B1, a height difference such as this may be compensated by means of a telescopic guide element. It is moreover desirable for a rail guidance system like this to be constructed sufficiently robustly for example to be able to withstand a large wind load. However, this guidance system limits the motion of the sliding device to a translation in the direction of the guide rail.

From U.S. Pat. No. 5,099,903, a foldable door is known, which makes use of a telescopic hinge at the top of its two outer posts. The telescopic hinge comprises a holder with a cylindrical bush that is fastened to the upper corner of the post. A spindle is mounted in this cylindrical bush, with a roller at its top, which connects to a guide rail above the folding door. The spindle with the roller is slidable along the longitudinal axis of the bush, and, in the fastened state, is forced upward by means of a spring to make contact with the guide rail. It is clear that the vertical hinge spindle coincides with the axis of the roller, so that the roller as well as the associated guide rail extend in a horizontal plane above the folding door. A hinge of this kind allows the folding door to be fastened or to be removed in an efficient manner, since the telescopic hinge allows the folding door to be lifted upward, wherein the spindle can be removed from the bush of the fixed hinge at the bottom of a post. It is clear that such systems comprise the risk that, for example through an unintentional lifting motion, or for example if a strong wind load also exerts an upward force on the folding door, the folding door may be disconnected unintentionally or undesirably. This may be dangerous, particularly with larger or heavier doors. In addition it is clear that a foldable door of this kind is secured on one of the outer posts by means of fixed hinges to a vertical wall next to the foldable door. These posts of a foldable door of this kind are fastened vertically. The foldable door is supported at the bottom at the level of this one fixed outer post at one point by means of a hinge point on which the weight of the swing door is supported. This has the drawback that, particularly in the unfolded state of the foldable door, the other, movable outer post is not supported, which gives rise to large forces at the level of the post with the fixed hinge point. This makes such a configuration unsuitable for reliable fastening of larger and/or heavier foldable doors, since this would give rise to inadmissibly high forces, deformations and/or the risk of coming out of the lowest hinge point at the level of the fixed post.

Another folding door is also known from U.S. Pat. No. 2,860,701. On the movable post of the folding door, a downward directed spindle is mounted at the bottom, which in the fastened state is mounted in a slot of a guidance device on the floor surface. At the top of this post, a telescopic hinge is mounted that consists of a cylindrical bush mounted on the post, in which a spindle is mounted slidably along the longitudinal axis of the bush, and wherein the upward directed end of this spindle is forced upward by a spring in order to engage, in the fastened state, in a slot of a guide rail that is mounted above the folding door. Here too, the purpose of the system is to make efficient fixing or removal of the folding door possible. As with U.S. Pat. No. 5,099,903, it is clear that such a system comprises the risk of being disconnected unintentionally or undesirably.

In addition, it is clear that the folding doors from U.S. Pat. No. 2,860,701 are secured, on their outer posts, by means of a hinge to a vertical wall next to the door. In addition it is desirable that the posts of the swing door are fastened vertically. Since these swing doors are supported at the bottom, the guide rail should consequently be mounted horizontally at the bottom, on which the weight of the swing door is supported. Or in other words, the system from U.S. Pat. No. 2,860,701 is not suitable for interacting with a guide rail at the bottom that is mounted on a ground surface with a certain slope.

There is thus a need for an alternative rail guidance system, as well as guide elements for the latter, which can compensate for a height difference on placement of the guide rail, which are robust and can withstand a large wind load on the sliding device, and which allow greater flexibility with respect to the motion of the sliding device, particularly also in the case of sliding devices with larger dimensions and/or greater weight.

SUMMARY

For this purpose, according to a first aspect a telescopic hinge is provided for a rail guidance system for guiding a sliding device along an elongated guide rail with a longitudinal axis, comprising:

- a first hinge part configured for being mounted to the sliding device;
- a second hinge part that is mounted rotatably in the first hinge part for rotation about a hinge-rotation axis, characterized in that the second hinge part:

- is mounted slidably in the direction of the hinge-rotation axis; and
- is configured to be coupled to the guide rail at one end slidably along the longitudinal axis.

By employing the telescopic hinge in the sliding device, a robust and simple system is formed that makes greater flexibility possible for the motion of the sliding device, since besides a translation, a rotation about the hinge spindle also becomes possible. Moreover, any height differences are also compensated in a simple and robust manner by the telescopic action of the telescopic hinge.

According to one embodiment, a telescopic hinge is provided, wherein the telescopic hinge further comprises:

a coupling piece mounted to the end of the second hinge part and configured for coupling the end of the second hinge part to the guide rail slidably along the longitudinal axis.

This allows the telescopic hinge to be coupled to the guide rail in a flexible manner and allows efficient mounting of the telescopic hinge.

According to another embodiment, a telescopic hinge is provided, wherein the coupling piece is coupled tiltably to the end of the second hinge part.

According to a preferred embodiment, the coupling piece is mounted to the end of the second hinge part tiltably about a tilt axis, wherein the tilt axis extends transversely or substantially transversely to the direction of the hinge-rotation axis, and/or also extends transversely and/or substantially transversely relative to the longitudinal axis of the guide rail.

According to a preferred embodiment, in the fastened state the tilt axis is horizontal or substantially horizontal and transverse or substantially transverse to the direction of the longitudinal axis of the guide rail.

This makes it possible, in a simple manner, to compensate for height differences, slopes, inclines, etc. of the ground to which the guide rail is fastened. The tiltable coupling piece also allows the hinge to be adapted in an efficient manner in various situations, with a varying slope of the ground surface on which the guide rail is fastened.

According to another embodiment, a telescopic hinge is provided, wherein the coupling piece and the guide rail are configured in such a way that in the coupled state they:

only allow a translation of the coupling piece in the direction of the longitudinal axis along the guide rail; and/or do not allow any translation of the coupling piece in a direction that intersects the direction of the longitudinal axis relative to the guide rail.

In this way, the coupling between the telescopic hinge and the guide rail is never lost. In this way, robust coupling is created, wherein contact between the guide rail and the coupling piece is assured in all circumstances.

According to another embodiment, a telescopic hinge is provided, wherein the coupling piece comprises an elongated slot with a cross section that abuts with the cross section of a guide element of the guide rail, and wherein the elongated slot is configured so that:

the guide element can only be inserted in the elongated slot in the direction of the longitudinal axis; and/or the guide element cannot be inserted in the elongated slot in a direction that intersects the direction of the longitudinal axis.

According to another embodiment, a telescopic hinge is provided, wherein the elongated slot of the coupling piece:

on a side directed toward the guide rail, forms an opening, the width of which is less than the maximum width of the slot; and/or is configured to abut, in a coupled state, with a guide rail that comprises a base at the level of the opening, the width of which is less than the maximum width of the guide element of the guide rail inserted in the slot.

In this way, a simple and reliable coupling is produced between the telescopic hinge and the guide rail.

According to another embodiment, a telescopic hinge is provided, wherein the end of the second hinge part, when the telescopic hinge is fastened to a sliding device, forms a downward directed end of the second hinge part that is configured to be coupled to the guide rail slidably along the longitudinal axis, when the guide rail is fastened to a surface. Moreover, it is clear that the surface may also be indicated as a ground surface.

This makes it possible for height differences, slopes, inclines, etc., which are typically present in the ground on which the guide rail is fastened, to be compensated, so that it is no longer necessary for an upright or leveling of the ground to be provided at the level of the guide rail and efficient, simple mounting of the guide rail is possible. In addition, this avoids said upright forming an additional obstacle over which a user has to step.

According to a second aspect, an assembly for a rail guidance system is provided, comprising at least one telescopic hinge according to the first aspect, wherein the assembly further comprises:

the guide rail configured for being coupled to the end of the telescopic hinge slidably along the longitudinal axis of the guide rail.

According to a preferred embodiment, in the fastened state, the guide rail to which the telescopic hinge is coupled, is fastened to the ground surface.

According to one embodiment, an assembly is provided, wherein the assembly further comprises:

at least one non-telescopic hinge comprising:

- a first hinge part configured for being mounted to the sliding device;
- a second hinge part that is mounted rotatably to the first hinge part for rotation about a hinge-rotation axis and is not slidable along the hinge-rotation axis;
- wherein the hinge-rotation axis of the non-telescopic hinge coincides with and/or lies in the extension of the hinge-rotation axis of the telescopic hinge; and a second guide rail that is located on an opposite side of the sliding device relative to the guide rail for the telescopic hinge and comprises a longitudinal axis that is parallel to the longitudinal axis of the guide rail for the telescopic hinge, and wherein the second hinge part of the non-telescopic hinge is configured to be coupled to the second guide rail slidably along the longitudinal axis.

According to a preferred embodiment, an assembly is provided wherein, in a fastening state, the second guide rail is positioned at the top of the sliding device and is configured so that the sliding device is fastened suspended.

According to another embodiment, an assembly is provided, wherein the assembly further comprises one or more of the aforementioned sliding devices to which an aforementioned telescopic hinge is mounted.

According to another embodiment, an assembly is provided, wherein the telescopic hinge is mounted onto and/or into an upright profile element of one or more sliding devices.

According to a preferred embodiment, the sliding device is fastened suspended on the second guide rail, which is positioned at the top of the sliding device.

According to a preferred embodiment, in a fastened state, the weight of the sliding device is carried completely or substantially completely by the second guide rail, which is positioned at the top of the sliding device.

According to a preferred embodiment, in a fastened state, the weight of the sliding device is not or substantially not taken by the guide rail that is fastened on the ground surface, and to which the sliding device is coupled by the telescopic hinge.

According to a preferred embodiment, in a fastened state, the sliding device is fastened suspended to the second guide rail that is positioned at the top of the sliding device, by means of the non-telescopic hinge and/or a guide element fastened to the non-telescopic hinge.

According to another embodiment, an assembly is provided, wherein the assembly comprises:

- two sliding devices mounted next to each other, which are provided with a telescopic hinge on their proximal end, wherein the telescopic hinge is configured so that the sliding devices mounted next to each other rotate toward each other; and/or
- two sliding devices mounted next to each other, which are each provided with a respective telescopic hinge on a respective distal end, so that their distal ends can be pushed toward each other along the guide rail by means of the telescopic hinges during and/or after rotation of their proximal ends in a direction away from the guide rail.

According to a third aspect, a kit of components for the telescopic hinge according to the first aspect and/or for the assembly according to the second aspect is provided, wherein the kit comprises:

- the first hinge part and the second hinge part for at least one telescopic hinge;
- optionally, the guide rail;
- optionally, the sliding device.

In this way the telescopic hinge and/or the assembly can be distributed in a simple manner, wherein for example use may be made of common components.

According to a fourth aspect, a method is provided for the manufacture, assembly and/or mounting of a telescopic hinge for a rail guidance system for guiding a sliding device along an elongated guide rail with a longitudinal axis according to the first aspect, comprising the following steps:

- providing the first hinge part configured for being mounted to the sliding device;
- mounting the second hinge part rotatably and slidably in the first hinge part for rotation about a hinge-rotation axis and slidably in the direction of the hinge-rotation axis; and
- providing the second hinge part so that it is configured for being coupled at one end slidably along the longitudinal axis to the guide rail by the coupling piece that is coupled tiltably on the end of the second hinge part.

In this way, the telescopic hinge and/or the assembly can be manufactured in a simple manner.

According to a fifth aspect, the use is provided of a telescopic hinge according to the first aspect and/or for the assembly according to the second aspect in a rail guidance system for sliding and/or rotating a sliding device, wherein:

- the first hinge part is mounted to the sliding device;
- the second hinge part, for rotation about a hinge-rotation axis and slidably in the direction of the hinge-rotation axis, is mounted rotatably and slidably in the first hinge part; and
- the second hinge part is coupled at one end slidably along the longitudinal axis to the guide rail by the coupling piece that is coupled tiltably on the end of the second hinge part.

It is clear that further embodiments, particularly of the third, fourth and fifth aspect, are possible with respect to embodiments of the telescopic hinge according to the first aspect and/or the assembly according to the second aspect.

DESCRIPTION OF THE FIGURES

Some embodiments without any limiting character are described in the appended figures.

DETAILED DESCRIPTION

Figure 1:
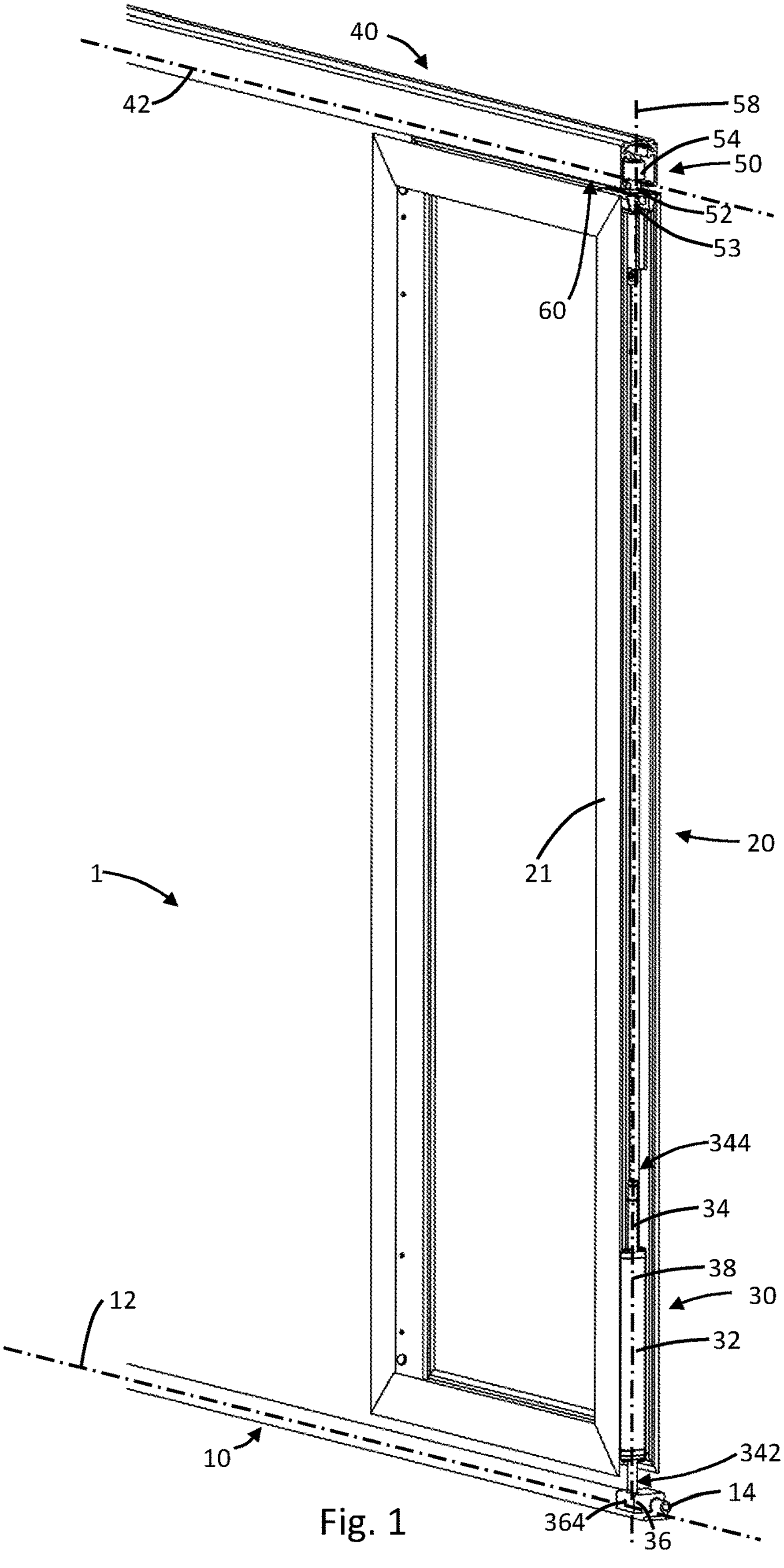
FIG. 1 shows a perspective view of an embodiment of a rail guidance system for a sliding device comprising an embodiment of a telescopic hinge.
Figure 2:
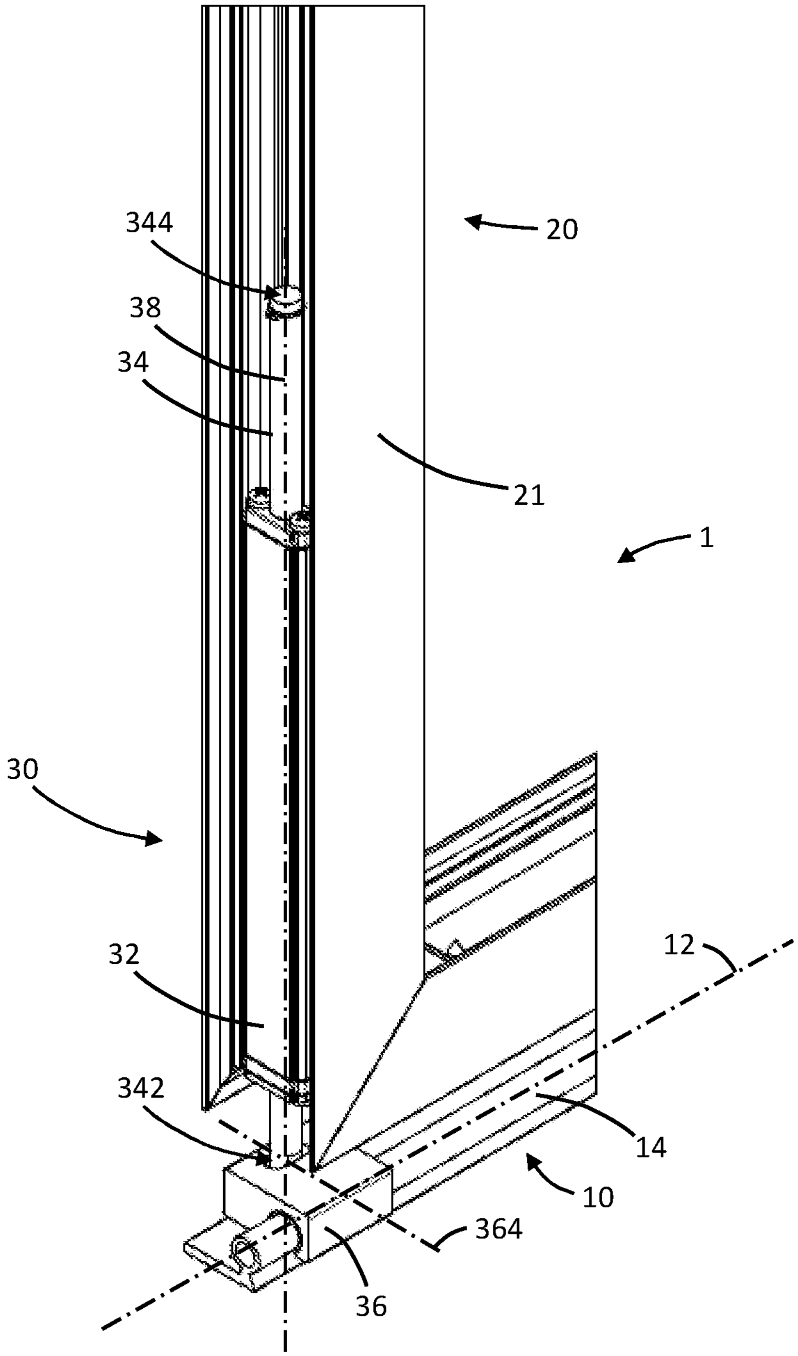
FIG. 2 shows the embodiment of the rail guidance system from FIG. 1 in more detail.

Before embodiments are described, it is clear that the extent of protection as defined in the claims is not limited to specific embodiments or combinations described, since such embodiments and combinations thereof may naturally vary. It should also be made clear that the terminology used herein is not intended as limiting. The extent of protection is determined by the appended claims.

As used hereinafter in this text, the singular forms "a" and "the" comprise both the singular and the plural unless the context is clearly otherwise.

The terms "contain", "contains" as used hereinafter are synonymous with "inclusive", "include" or "comprise, "comprises" and are inclusive or open and do not exclude additional, unnamed members, elements or method steps. The terms "comprise", "comprises" include the term "contain", "contains" and/or vice versa.

The enumeration of numerical values on the basis of a range of digits comprises all values and fractions in this range, as well as the stated end points.

The term "about", "in essence", "mainly", "substantially" or "approximately", as used when referring to a measurable value such as a parameter, an amount, a duration, an angle, a direction, and so on, is intended to include variations of ±10% or less, preferably ±5% or less, more preferably ±1% or less, and even more preferably ±0.1% or less, above and below the specified value, insofar as the variations are applicable for functioning in the invention described herein. It is clear that the value to which the term "about", "in essence", "mainly" or "approximately" refers per se, was also made known.

Various aspects and/or embodiments are defined further in the following passages. Moreover, each aspect and/or embodiment, which is thus defined in the following passages, may be combined with another aspect or aspects, and/or embodiment or embodiments, unless the contrary is clearly stated. In particular, a feature indicated as "preferred" or "advantageous", "optional", "by way of example", "for example", etc., may be combined with other features or properties that are stated as "preferred" and/or "advantageous", "optional", "by way of example", "for example", etc. Such combinations and/or variations of aspects and/or embodiments are, however, also possible for aspects and/or embodiments for which no particular indication is stated. Reference in this description to "one embodiment" or "an embodiment" signifies that a certain function, structure or characteristic described in connection with the embodiment is applicable in at least one embodiment of the present invention. When the phrases "in one embodiment" or "an embodiment" are given at various points in this text, they do not necessarily refer to the same embodiment, although this is not excluded. Moreover, the aspects, embodiments, features, structures or characteristics described may be combined in any suitable way, such as is clear to a person skilled in the art on the basis of this description. The embodiments described, and claimed in the claims, may thus be used in any suitable combination. In the present description, reference is made to the appended drawings, which form a part thereof, and which illustrate specific embodiments by way of example. References, for example such as reference numbers, etc., which refer to certain elements, refer to the respective elements as an example, without necessarily limiting the elements thereby to the embodiments illustrated in the figures. It must be understood that further and/or alternative embodiments may be used and structural or logical changes may be made while remaining within the extent of protection as defined by the claims. The following detailed description is not to be considered as limiting, and the extent of protection is defined by the appended claims.

Unless defined otherwise, all terms as used, including technical and scientific terms, have the meaning such as is usually understood by a person skilled in the art. As further guidance, definitions are given for further explanation of terms that are used here.

FIG. 1 shows schematically an embodiment of a rail guidance system 1 for guiding a sliding device 20 along an elongated guide rail 10 with a longitudinal axis 12. According to the embodiment shown, the rail guidance system 1 comprises one or more of said sliding devices 20 and the guide rail 10. According to this embodiment, the sliding device 20 is for example a window, door, frame, etc., which is mounted slidably along the guide rail 10, for example as a component of a wall of a terrace covering, a wall of a veranda, a sliding door, sliding window, sliding panel, etc. on or in any other suitable building structure, such as a building, dwelling, apartment, shed, warehouse, office space, etc. It is then clear that the longitudinal axis 12 of the guide rail 10, which for example is fastened on a ground surface, follows the direction of the ground surface. If this relates to a ground surface aligned horizontally or substantially horizontally in the direction of the longitudinal axis 12, then the longitudinal axis 12 will extend horizontally or substantially horizontally. If, however, this relates to a ground surface that extends in the direction of the longitudinal axis 12 at an angle and/or slope relative to a horizontal plane, then the direction of the longitudinal axis 12 will also extend at the same slope and/or angle relative to a horizontal plane. As stated above, the latter is often the case when using a rail guidance system 1 of this kind on an inclined ground surface for example for a terrace, a balcony, etc. or any other situation where the ground surface is at a certain slope, for example in order to allow water to flow away on such a ground surface in a particular direction.

As can be seen, the telescopic hinge 30 comprises a first hinge part 32 that is mounted to the sliding device 20. The telescopic hinge 30 further comprises a second hinge part 34 that is mounted rotatably in the first hinge part 32 for rotation about a hinge-rotation axis 38. It is then clear that the hinge-rotation axis 38 runs in an upward and/or downward direction, for example in a vertical and/or substantially vertical direction, in the state shown in FIG. 1.

As also shown, the embodiment in FIG. 1 further comprises a coupling piece 36 that is mounted to the end 342 of the second hinge part 34. This coupling piece 36 is, as shown, configured for coupling the end 342 of the second hinge part 34 slidably to the guide rail 10. In other words, this coupling piece 36 is configured for being pushed along the guide rail 10 in the direction of the longitudinal axis 12, so that the end 342 of the second hinge part 34, which is mounted to this coupling piece 36, is also pushed in this direction along the guide rail 10. As explained in more detail hereunder, it is advantageous, according to the embodiment example shown, to couple the coupling piece 36 tiltably on the end 342 of the second hinge part 34. As can be seen in FIG. 1, and as explained in more detail hereunder, the coupling piece 36 is mounted tiltably about a tilt axis 364 on the end 342 of the second hinge part 34, wherein the tilt axis 364 extends transversely or substantially transversely to the direction of the hinge-rotation axis 38, and which also extends transversely and/or substantially transversely relative to the longitudinal axis 12 of the guide rail 10. As can be seen, this means for the state shown, a horizontal or substantially horizontal tilt axis 364 transverse or substantially transverse to the direction of the longitudinal axis 12 of the guide rail 10. In other words, it is clear that the tilt axis 364 does not extend in the direction of the hinge rotation axis 38.

Figure 3:
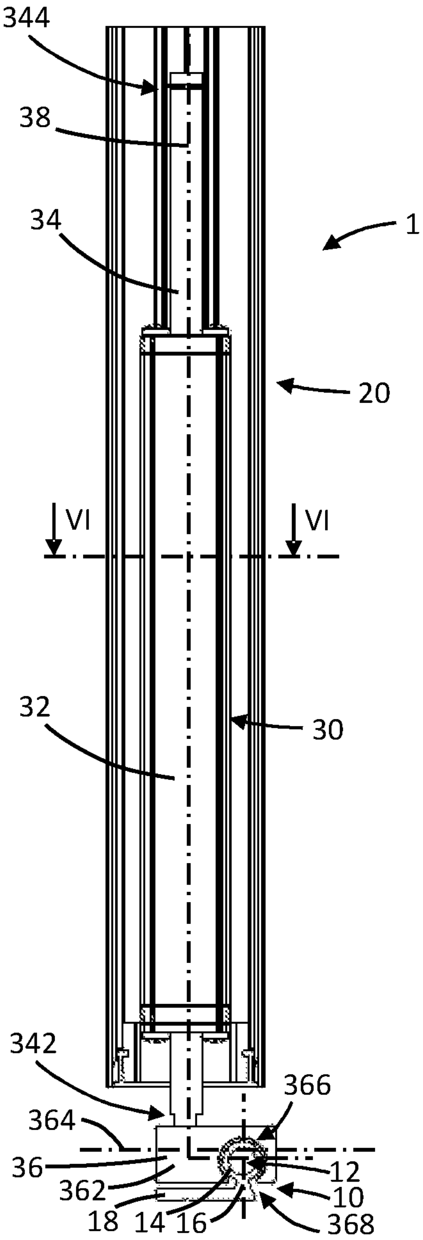
FIG. 3 shows a side view of the embodiment from FIG. 2.
Figure 5:
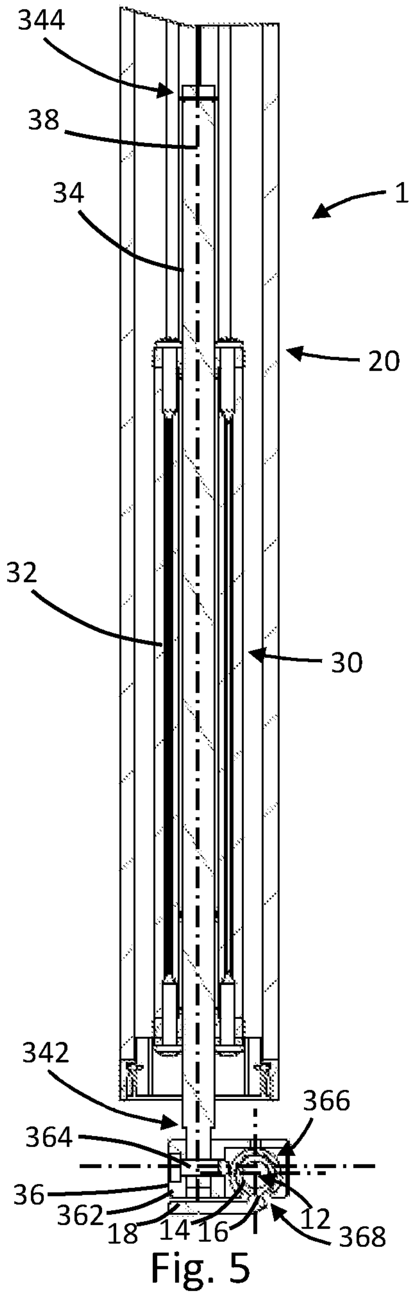
FIG. 5 shows a view similar to FIG. 3, of a cross section along line V-V in FIG. 4.
Figure 4:
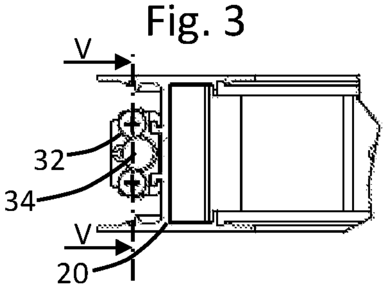
FIG. 4 shows a top view of the embodiment in FIG. 3.
Figure 6:
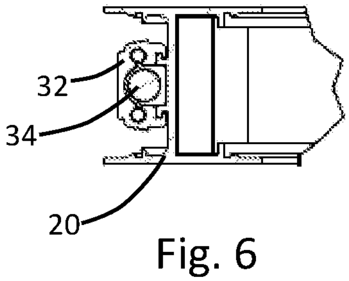
FIG. 6 shows a view similar to FIG. 4, of a cross section along line VI-VI in FIG. 5.

As can be seen in FIG. 3 and FIG. 5, for example, the coupling piece 36 comprises an elongated slot 366, which is provided in the base body 362. It is clear that in the coupled state, as shown in FIG. 3 and FIG. 5, according to an embodiment of this kind, the longitudinal axis of this elongated slot 366 coincides with and/or is parallel to the longitudinal axis 12 of the guide rail 10. According to the embodiment example shown, this slot 366 has a substantially circular cross section that comprises a downward directed opening. The circular cross section of the slot 366 abuts with the circular cross section of the elongated guide element 14 of the embodiment shown of the guide rail 10 and the downward facing opening of the slot 366 abuts with a base 16 of the guide rail, which connects the guide element 14 to a fastening element 18. According to the embodiment shown, the fastening element 18 comprises for example a fastening plate 18 for fastening the guide rail 10 to the ground surface.

According to the embodiment example shown, the elongated guide rail 10 comprises a guide element 14 with a circular cross section which, in the coupled state, abuts with the circular perimeter of the slot 366 of the guide element 14 of the guide rail 10. According to this embodiment, the slot 366 further comprises a downward facing opening 368 that abuts with the base 16 of the guide element 10. It is clear that the width, i.e. in a direction transverse to the longitudinal direction 12 and substantially horizontal or parallel to the ground surface, of the base 16 of the guide rail 10 is less than the maximum width of the guide element 14 extending above it. Similarly, the width of the downward facing opening 368 of the slot 366 at the bottom of the coupling piece 36 that abuts onto the base 16, is thus smaller than the higher located maximum width of the part of the slot 366 that abuts onto the guide element 14 of the guide rail 10 inserted in the slot 366. It is clear that according to an embodiment of this kind, for the coupling piece 36, when coupled to the guide element 14 of the guide rail 10, by means of the elongated slot 366, only a translation of the coupling piece 36 in the longitudinal direction 12 of the guide rail 10, which is parallel to the longitudinal direction of the slot 366, is possible along the guide element 14 of the guide rail 10 inserted in the slot 366. In other words, another translation, in another direction, is prevented through engagement of said coupling piece 36 on the guide rail 10, i.e. no translation of the coupling piece is possible relative to the guide rail 10 in an upward or downward direction, or in a direction parallel to the ground surface but transverse relative to the longitudinal axis 12, or in any other direction that intersects the direction of the longitudinal axis 12.

In other words, the coupling piece 36 is configured for coupling the end 342 of the second hinge part 34 to the guide rail 10 so that with a change of the distance between the sliding device 20 and the guide rail 10, the coupling with the guide rail 10 is maintained. In other words, when this distance between the guide rail 10 and the sliding device 20 changes, during sliding of the sliding device 20 along the guide rail 10, this change will thus be compensated by a translation of the second hinge part 34 relative to the first hinge part 32 along the hinge-rotation axis 38 of the telescopic hinge 30. According to the state of the embodiment shown in FIGS. 1 to 6, this thus means that the second hinge part 34 can move up or down relative to the first hinge part 32, or in other words relative to the sliding device 20, when the distance between the guide rail 10, or in other words the ground surface on which the guide rail 10 is fastened, changes.

Figure 8:
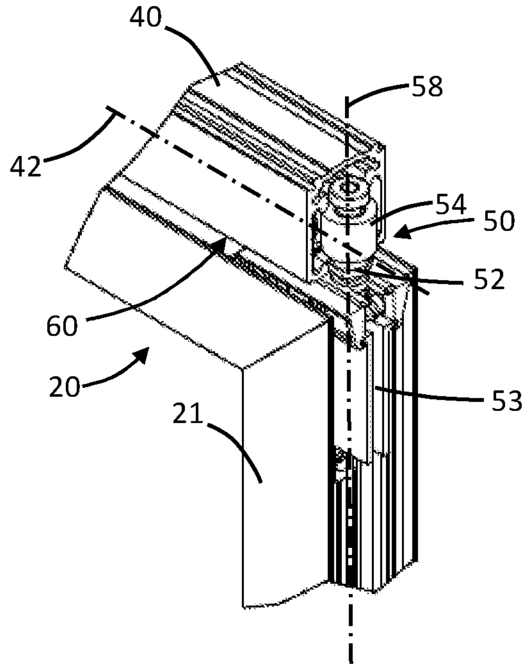
FIG. 8 shows a partial section of a detail of the embodiment in FIG. 1.
Figure 9:
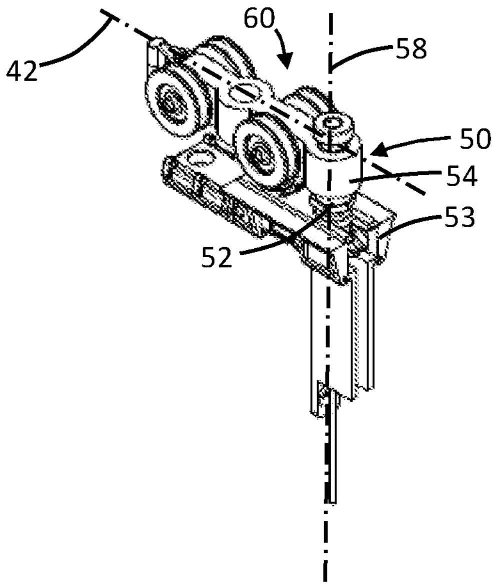
FIG. 9 shows in more detail an embodiment of a number of elements from FIG. 8.
Figure 10:
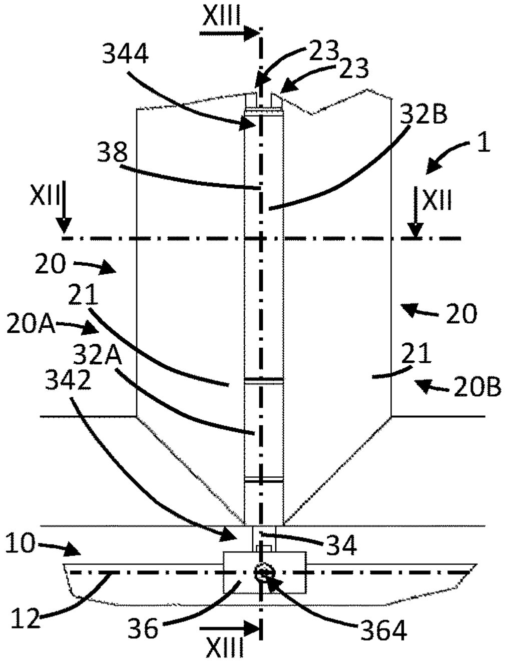
FIG. 10 shows a front view of an alternative embodiment of a rail guidance system.
Figure 12:
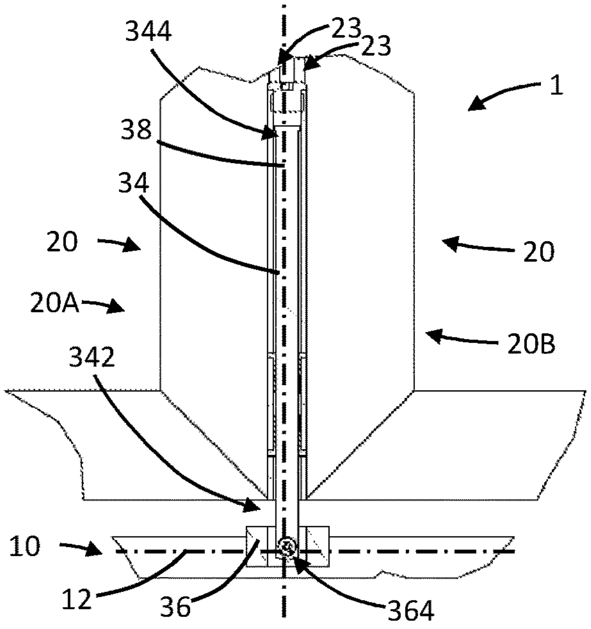
FIG. 12 shows a cross section along line XI-XI in FIG. 11.
Figure 11:
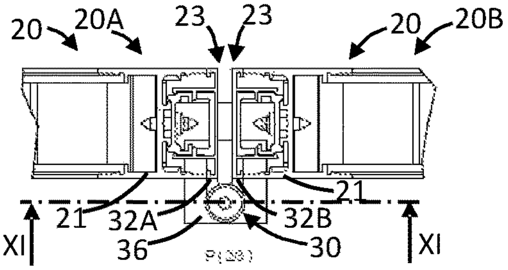
FIG. 11 shows a top view of the embodiment in FIG. 10.
Figure 13:
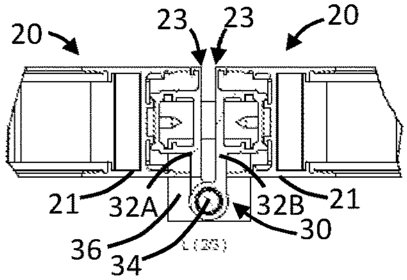
FIG. 13 shows a cross section along line XII-XII in FIG. 10.
Figure 14:
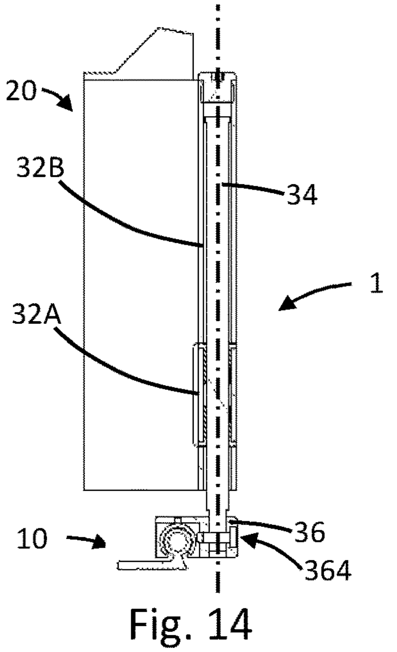
FIG. 14 shows a cross section along line XIII-XIII in FIG. 10.

It is clear that the sliding device 20, in the embodiment example shown, at the top is also preferably mounted by means of a hinge 50 to a guide rail 40, wherein this hinge is configured for rotation about a hinge-rotation axis 58 in the extension of the hinge-rotation axis 38 of the telescopic hinge 30, for example as shown in FIG. 1. The hinge 50 at the opposite end of the sliding device 20 is preferably not telescopic and can be mounted at the top in the usual way, for example by means of a suitable guide element 60, such as is illustrated by FIG. 9, such as a carriage or any other suitable guide element, movably along the guide rail 40. An embodiment of said hinge 50 as well as the guiding means are shown in more detail in FIGS. 8 and 9. It is then clear that the hinge 50 for example comprises a first hinge part 52 that is mounted to the sliding device 20. According to the embodiment example shown, the first hinge part is mounted by means of fasteners 53 to the sliding device 20. As shown, and most clearly in FIG. 9, according to this embodiment the hinge 50 comprises a second hinge part 54 that is mounted to the guide element 60 and that is configured to interact with the first hinge part to make rotation of the guide element 60 relative to the sliding device 20 possible about the hinge-rotation axis 58. According to the embodiment example shown, the guide element 60 comprises running wheels and is configured so that it can interact with the guide rail 40 for guiding the guide element 60 along or, in the embodiment example shown, inside the guide rail 40. It is then clear that according to the embodiment example shown, the sliding device 20 is fastened suspended from the guide rail 40, which is positioned at the top of the sliding device. This means that the weight of the sliding device 20 is carried completely or substantially completely by this guide rail 40. Or in other words that the weight of the sliding device 20 is not or is barely received by a guide rail 10 that is fastened to the ground surface. It is then clear that alternative embodiments are possible, wherein the sliding device 20 is fastened suspended from the guide rail 40, which is positioned at the top of the sliding device 20, for example by means of any suitable non-telescopic hinge and/or guide element 60. It is also clear that then the sliding device 20 is coupled to the opposite guide rail 10, which is positioned on the ground surface, by means of telescopic hinge 30, wherein the weight of the sliding device is not, or is substantially not, transferred by the telescopic hinge 30 to this guide rail 10 on the ground surface.

It is clear that the longitudinal direction 42 of the guide rail 40, at the top of the sliding device 20, is parallel to the longitudinal direction 12 of the guide rail 10 at the bottom of the sliding device 20. In a frequently occurring situation, this guide rail 40, for example at the top of a sliding device 20, such as a sliding door, sliding window, sliding panel, etc., is mounted level, whereas the opposite guide rail 10 at the bottom of the sliding device 20 preferably follows any slope or the differences in level of the ground surface. In other words the guide rail 40, at the top of the sliding device 20, is mounted horizontally or substantially horizontally.

It is also clear that according to the embodiment example shown, the cross section of the guide element 14 has an element with a circular or substantially circular cross section that is fastened to the fastening plate 18 via a narrower base 16. It is clear, however, that a number of variant embodiments are possible wherein another guide element 14 or other elements of the guide rail 10 have another suitable cross section, for example such as a guide element 14 with the cross section of a polygon, a suitable profiled shape, etc. It is clear that according to such embodiments, the telescopic hinge 30 then comprises a coupling piece 36 with an elongated slot 366 that forms, on a side facing the guide rail 10, an opening 368, the width of which is less than the maximum width of the slot 366. Furthermore, according to such embodiments, the slot 366 in a coupled state abuts onto a guide rail 10. Moreover, this guide rail 10 comprises a base 16 at the level of the opening 368, in the side of the coupling piece 36 facing the guide rail 10, the width of which is less than the maximum width of the guide element 14 of the guide rail 10 inserted in the slot 366 of the coupling piece 36. It is then clear that just like the guide rail 10, the guide element 14, the base 16, the slot 366 and the opening 368 are elongated and extend in the direction of the longitudinal axis 12.

According to such embodiments it is thus advantageous that the coupling piece 36 comprises an elongated slot 366 with a cross section that abuts with the cross section of a guide element 14 of the guide rail 10 so that the elongated slot 366 cannot lose contact with the guide element 14, to make the telescopic action of the telescopic hinge 30 possible. This means for example that as in the embodiment example shown, the elongated slot 366 and the associated guide element 14 are configured in such a way that the guide element 14 can only be inserted in the elongated slot 366 in the direction of the longitudinal axis 12. In other words, according to such embodiments the elongated slot 366 is clamped to or round the guide element 14 slidably in the longitudinal direction 12. According to such embodiments, the guide element 14 need not be inserted in the elongated slot 366 in a direction that intersects the direction of the longitudinal axis 12, or the guide element 14 thus also does not need to be removed from the elongated slot 366 in said direction. This means in particular that with a telescopic motion of the second hinge part 34 of the telescopic hinge 30 about the hinge-rotation axis 38, the coupling between the second hinge part 34 on the end 342 and the guide rail 10 is maintained by means of coupling piece 36.

According to these embodiments, the coupling piece 36 and/or the guide rail 10 are configured so that, and/or interact in such a way that, in the coupled state they only allow a translation of the coupling piece 36 in the direction of the longitudinal axis 12 along the guide rail 10. In other words, similarly to the embodiment example shown, it is clear that in the coupled state no translation of the coupling piece 36 is possible in a direction that intersects the direction of the longitudinal axis 12 relative to the guide rail 10.

Figure 7:
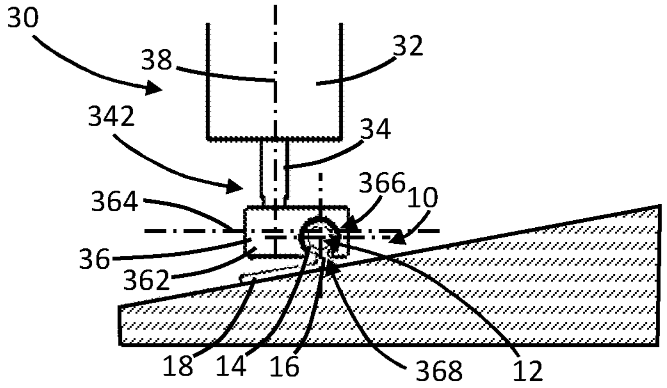
FIG. 7 shows a view similar to FIG. 3, of an embodiment similar to FIG. 3.

FIG. 7 shows a view of an embodiment of the telescopic hinge 30 and the guide rail 10 similar to the embodiment shown in FIGS. 1 to 6. The view is similar to the view shown in FIG. 3, namely a view in the direction of the longitudinal axis 12 of the guide rail 10. The state illustrated in FIG. 7 shows that such an embodiment, wherein the slot 366 has a substantially circular cross section, and wherein the slot 366 comprises a downward facing opening, and wherein this circular cross section of the slot 366 abuts onto the circular cross section of the elongated guide element 14 of the guide rail 10, and wherein the downward facing opening of the slot 366 abuts onto a base 16 of the guide rail 10 that connects the guide element 14 to a fastening element 18, is able, besides a gradient or irregularity of the ground in the direction of the longitudinal axis 12 of the guide rail 10, also to compensate for a gradient or irregularity of the ground transverse to the direction of the longitudinal axis 12 of the guide rail 10. For this purpose, preferably the downward facing opening of the slot 366 is large enough so that it is a segment in the range from 5° up to and including 150° inclusive, preferably 10° up to and including 120° inclusive, for example 15° up to and including 90°, for example 30° or 60° of the circular cross section of the slot 366. Preferably the distance between the opposite ends of the downward facing opening of the slot 366, i.e. transversely to the direction of the longitudinal axis 12 of the guide rail 10, is greater than this distance of the narrower base 16 from the guide rail 10. Or in other words, if the base 16 extends, at the level of the downward facing opening of the slot 366, over a smaller segment of the circular cross section of the slot 366, for example a segment that is at least 10% smaller, preferably 20% smaller, for example 50% smaller, than the segment that corresponds to the downward facing opening of the slot 366.

However, it is clear that according to embodiments of an assembly of this kind, the assembly may also additionally comprise a non-telescopic hinge 50 that interacts with a second guide rail 40 and the sliding device 20, for example as described above with reference to FIG. 8 and FIG. 9. It is clear, however, that in the case of assemblies with several telescopic hinges 30, similarly several non-telescopic hinges 50 may be present. It is also clear that alternative embodiments of such an assembly are possible, wherein the non-telescopic hinge 50 comprises a first hinge part 52 that is configured for being mounted to the sliding device 20 and comprises a second hinge part 54 that is mounted rotatably on the first hinge part 52 for rotation about a hinge-rotation axis 58 and is not slidable along the hinge-rotation axis 58. According to such embodiments, in that case the hinge-rotation axis 58 of the non-telescopic hinge 50 coincides with and/or lies in the extension of the hinge-rotation axis 38 of the telescopic hinge 30. It is also clear that according to such embodiments the assembly also comprises a second guide rail 40 that is located on an opposite side of the sliding device 20 relative to the guide rail 10 for the telescopic hinge 30 and comprises a longitudinal axis 42 that is parallel to the longitudinal axis 12 of the guide rail 10 for the telescopic hinge 30. It is clear that in embodiments of the assembly that comprises several telescopic hinges 30 for several sliding devices 20, preferably each telescopic hinge 30 comprises a corresponding non-telescopic hinge 50. According to such embodiments it is also clear that the second hinge part 54 of the non-telescopic hinge 50 is configured to be coupled to the second guide rail 40 slidably along the longitudinal axis 12. This may for example be realized with alternative guide elements 60 to the carriage, or the wheels, shown in FIG. 9, for example such as a guide element that comprises a suitable material with a low friction coefficient, etc. According to yet other embodiments, the second hinge part 54 may itself be configured to be coupled slidably to the second guide rail 40, without the need for a separate guide element 60.

It is clear that according to the embodiment shown in FIGS. 1 to 6, the rail guidance system 1 thus comprises an assembly that comprises the telescopic hinge 30 and the guide rail 10. It is clear that alternative embodiments are possible for said assembly for a rail guidance system 1, wherein for example one or more telescopic hinges 30 interact with a guide rail 10. Just as described above, in these embodiments the guide rail 10 is configured to be coupled at the end 342 of the telescopic hinge 30 slidably along the longitudinal axis 12 of the guide rail 10. According to these embodiments, for example several sliding devices 20 may be mounted along a guide rail 10, the sliding devices 20 of which, which are configured for performing, besides a sliding movement, also a rotating motion about an upward directed rotation axis, are each provided with an embodiment of a respective telescopic hinge 30 similar to that described above. According to the embodiment example of FIGS. 1 to 6, this may thus also mean that each sliding device 20 comprises an associated, separate telescopic hinge 30.

According to an alternative embodiment, said telescopic hinge 30 may also be used for two sliding devices 20 mounted next to each other. This means that the telescopic hinge 30 is mounted to two sliding devices 20 that are mounted next to each other. Like in the embodiment described above, the embodiment shown in FIGS. 10 to 14 comprises a telescopic hinge 30 with a second hinge part 34 that is mounted slidably in the direction of the hinge-rotation axis 38 and is configured to be coupled to the guide rail 10 at one end 342 slidably along the longitudinal axis 12. Like in the embodiment in FIGS. 1 to 6, the second hinge part 34 is coupled to the guide rail by means of a similar coupling piece 36. Similar elements in the embodiment in FIGS. 10 to 14 are also indicated with similar references and function in a similar manner as described above with reference to FIGS. 1 to 6. The embodiment in FIGS. 10 to 14 differs, however, in that the telescopic hinge 30 has a common second hinge part 34 that interacts with the first hinge part 32A that is mounted to a first sliding device 20A and a first hinge part 32B that is mounted to a second adjacent sliding device 20B. These respective first hinge parts 32A and 32B are thus each mounted respectively to their corresponding sliding device 20A, 20B at the level of the proximal end 23 of these sliding devices 20A, 20B. It is clear that according to the embodiment example shown, the proximal end 23 of the adjacent sliding devices 20 is located at the level of the upright profile 21 that is located closest to the adjacent sliding device 20, or in other words the end of the sliding device 20 that is directed toward the adjacent sliding device 20. According to the embodiment example shown, it is clear that the telescopic hinge 30 functions for its hinge action as a hinge with two wings 32A, 32B that comprise eyes or cylinders that hinge about a central elongated pin 34 that determines the hinge-rotation axis 38. As described above, this pin 34, which is formed by the second hinge part 34 fastened slidably with respect to this hinge-rotation axis 38 in both first hinge parts 32A, 32B, so that as described above, through the telescopic action of the second hinge part 34 relative to the first hinge parts 32A, 32B with a change of the distance between the sliding devices 20 and the guide rail 10, the coupling of the second hinge part 34 with the guide rail can be maintained. It is thus clear that according to an embodiment of this kind, both sliding devices 20 can, on their proximal end 23, perform a rotation about this common hinge-rotation axis 38. As shown, according to this embodiment, the hinge-rotation axis 38, as well as the longitudinal axis of the guide rail 10, are mounted next to the longitudinal plane of the sliding device 20, or in other words, the telescopic hinge is for example mounted to a front or back of the frame 20 to allow two nearby frames 20 to hinge between a position in which the longitudinal plane of both frames is parallel to the longitudinal axis of the guide rail 10 and a position in which one or both adjacent frames 20 may be rotated about this hinge-rotation axis 38 in a direction toward the side where the telescopic hinge 30 was fastened to the sliding device 20. If the telescopic hinge 30 was for example fastened to the front of a frame 20, then for example in the direction of the front of the frame 20. In other words, the adjacent sliding devices 20 can be rotated toward each other by means of said telescopic hinge 30.

It is clear that yet other alternative embodiments are possible of an assembly that comprises one or more sliding devices 20 on which a telescopic hinge 30 is mounted. Preferably, similarly to as described above, the telescopic hinge 30 is mounted onto and/or into an upright profile element 21 of one or more sliding devices 20.

Figure 15:
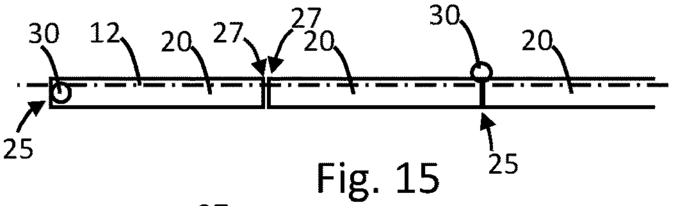
FIGS. 15 and 16 show various states of an embodiment of an assembly with several sliding devices mounted next to each other.
Figure 16:
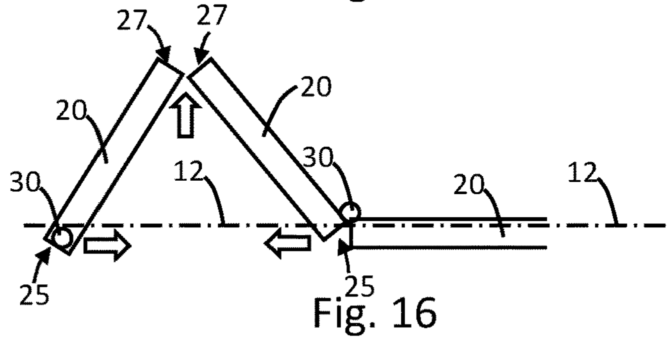

FIG. 15 shows for example schematically an embodiment example of such an assembly in which several sliding devices 20 mounted next to each other are each provided with a respective telescopic hinge 30. Two of the sliding devices mounted next to each other are provided with a telescopic hinge 30 on a respective distal end 25. It is clear that as shown schematically with the longitudinal axis 12, the sliding devices 20 mounted next to each other can be pushed by means of the telescopic hinges 30 along the guide rail 10. Moreover, the telescopic hinges 30 may be similar and/or different. According to the embodiment example shown, the telescopic hinge 30 that is located in the extreme left position is for example a telescopic hinge 30 according to the embodiment as shown in FIGS. 1 to 6 and the other telescopic hinge 30 is a common telescopic hinge 30 for example as shown in FIGS. 10 to 14. It is clear, however, that a number of variant embodiments are possible, wherein any combination of similar and/or different telescopic hinges is possible. As explained on the basis of FIG. 16, which shows the embodiment in FIG. 15 in another state, wherein the distal ends 25 of two adjacent sliding devices can be pushed toward each other along the guide rail 10 by means of the telescopic hinges 30 during and/or after rotation of the proximal ends 27 of these sliding devices 20 in a direction away from the guide rail 10, as indicated schematically with the arrows.

It is also clear that the embodiments of the telescopic hinge and/or the assemblies for example such as described above, may optionally be offered in the form of a kit of components, which for example comprises the first hinge part 32 and the second hinge part 34 for at least one telescopic hinge 30. Optionally, the kit may also comprise the guide rail 10, the sliding device 20, and/or any other suitable component of the embodiment of the telescopic hinge and/or the assemblies for example such as described above.

It is also clear that a telescopic hinge 30 for a rail guidance system 1 for guiding a sliding device 20 along an elongated guide rail 10 with a longitudinal axis 12 similar to that described above can be manufactured, assembled and/or mounted in a simple manner. For example, the second hinge part 34 may be mounted rotatably and slidably in the first hinge part 32 for rotation about a hinge-rotation axis 38 and slidably in the direction of the hinge-rotation axis 38. The first hinge part 32 is then mounted to the sliding device 20 and the second hinge part 34 is coupled to the guide rail 10 at an end 342 slidably along the longitudinal axis 12.

Finally, the use of the embodiments of the telescopic hinge and/or the assembly for example such as described above in a rail guidance system 1 for sliding and/or rotating a sliding device 20 is also clear.

It is clear that a number of further combinations and/or variant embodiments are possible without departing from the extent of protection as defined in the claims.

The invention claimed is:

1. A telescopic hinge for a rail guidance system for guiding a sliding device along an elongated guide rail with a longitudinal axis, comprising:

a first hinge part configured for being mounted to the sliding device;

a second hinge part that is mounted rotatably in the first hinge part for rotation about a hinge-rotation axis, wherein the second hinge part:

is mounted slidably in the direction of the hinge-rotation axis; and is configured for being coupled to the guide rail at an end slidably along the longitudinal axis, and wherein the telescopic hinge further comprises:

a coupling piece mounted to the end of the second hinge part and configured for coupling the end of the second hinge part slidably along the longitudinal axis to the guide rail, wherein the coupling piece is coupled tiltably to the end of the second hinge part about a tilt axis transverse to the hinge rotation axis.

2. A telescopic hinge as claimed in claim 1, wherein the coupling piece is engaged with the guide rail to only allow a translation of the coupling piece in the direction of the longitudinal axis along the guide rail; and/or do not allow any translation of the coupling piece in a direction that intersects the direction of the longitudinal axis relative to the guide rail.

3. A telescopic hinge as claimed in claim 2, wherein the coupling piece comprises an elongated slot with a cross section that abuts with the cross section of a guide element of the guide rail, and wherein the elongated slot is configured so that:

the guide element can only be inserted in the elongated slot in the direction of the longitudinal axis; and/or the guide element cannot be inserted in the elongated slot in a direction that intersects the direction of the longitudinal axis.

4. A telescopic hinge as claimed in claim 3, wherein the elongated slot of the coupling piece:

is on a side facing the guide rail, forms an opening, the width of which is less than the maximum width of the slot; and/or is configured to abut, in a coupled state, with a guide rail that comprises a base at the level of the opening, the width of which is less than the maximum width of the guide element of the guide rail inserted in the slot.

5. A telescopic hinge as claimed in claim 1, wherein when the telescopic hinge is fastened to a sliding device, the coupling piece includes a downward facing end that is configured to be coupled to the guide rail slidably along the longitudinal axis, when the guide rail is fastened to a ground surface.

6. An assembly for a rail guidance system, comprising at least one telescopic hinge as claimed in claim 1, wherein the assembly further comprises:

the guide rail configured for being coupled to the coupling piece slidably along the longitudinal axis of the guide rail.

7. An assembly as claimed in claim 6, wherein, in the fastened state, the guide rail to which the telescopic hinge is coupled, is fastened to the ground surface.

8. An assembly as claimed in claim 6, wherein the assembly further comprises:

at least one non-telescopic hinge comprising:

a first hinge part configured for being mounted to the sliding device;

a second hinge part that is mounted rotatably to the first hinge part for rotation about a hinge-rotation axis and is not slidable along the hinge-rotation axis;

wherein the hinge-rotation axis of the non-telescopic hinge coincides with and/or lies in the extension of the hinge-rotation axis of the telescopic hinge; and a second guide rail that is located on an opposite side of the sliding device relative to the guide rail for the telescopic hinge and comprises a longitudinal axis that is parallel to the longitudinal axis of the guide rail for the telescopic hinge, and wherein the second hinge part of the non-telescopic hinge is configured for being coupled to the second guide rail slidably along the longitudinal axis.

9. An assembly as claimed in claim 8, wherein, in a fastening state, the second guide rail is positioned at the top of the sliding device and is configured for suspended fastening of the sliding device.

10. An assembly as claimed in claim 8, wherein the assembly further comprises one or more of the aforementioned sliding devices onto which the telescopic hinge is mounted.

11. An assembly as claimed in claim 8, wherein the telescopic hinge is mounted onto and/or into an upright profile element of one or more sliding devices.

12. An assembly as claimed in claim 8, wherein the assembly comprises:

two sliding devices mounted next to each other, which are provided with the at least one telescopic hinge on their proximal end, wherein each telescopic hinge is configured for the sliding devices mounted next to each to be rotated toward each other; and/or two sliding devices mounted next to each other, which are each provided with the at least one respective telescopic hinge at a respective distal end, so that their distal ends can be pushed toward each other along the guide rail by means of the telescopic hinges during and/or after rotation of their proximal ends in a direction away from the guide rail.

13. A kit of components for the telescopic hinge as claimed in claim 1, wherein the kit comprises:

the first hinge part and the second hinge part for at least one telescopic hinge.

14. A method for at least one of the manufacture, assembly and mounting of a telescopic hinge for a rail guidance system for guiding a sliding device along an elongated guide rail with a longitudinal axis as claimed in claim 1, comprising the following steps:

providing the first hinge part configured for being mounted onto the sliding device;

mounting the second hinge part rotatably and slidably in the first hinge part for rotation about a hinge-rotation axis and slidably in the direction of the hinge-rotation axis; and providing the second hinge part so that it is configured for being coupled to the guide rail at an end slidably along the longitudinal axis via the coupling piece that is coupled tiltably to the end of the second hinge part.

15. The use of a telescopic hinge as claimed in claim 1 in a rail guidance system for sliding and/or rotating a sliding device, wherein:

the first hinge part is mounted to the sliding device;

the second hinge part, for rotation about a hinge-rotation axis and slidably in the direction of the hinge-rotation axis, is mounted rotatably and slidably in the first hinge part; and the second hinge part is coupled to the guide rail at an end slidably along the longitudinal axis via the coupling piece that is coupled tiltably to the end of the second hinge part.

16. The kit of components as claim in claim 13 further comprising the guide rail and the sliding device.

* * * * *